US011163980B2

United States Patent
Ambai et al.

(10) Patent No.: US 11,163,980 B2
(45) Date of Patent: Nov. 2, 2021

(54) FEATURE POINT ESTIMATION DEVICE, FEATURE POINT POSITION ESTIMATION METHOD, AND COMPUTER-READABLE MEDIUM

(71) Applicant: DENSO CORPORATION, Kariya (JP)

(72) Inventors: Mitsuru Ambai, Hiratsuka (JP); Yutaka Munaoka, Kariya (JP); Takuhiro Omi, Kariya (JP)

(73) Assignee: DENSO CORPORATION, Kariya (JP)

( * ) Notice: Subject to any disclaimer, the term of this patent is extended or adjusted under 35 U.S.C. 154(b) by 249 days.

(21) Appl. No.: 16/305,909

(22) PCT Filed: May 22, 2017

(86) PCT No.: PCT/JP2017/018954
§ 371 (c)(1),
(2) Date: Nov. 30, 2018

(87) PCT Pub. No.: WO2017/208875
PCT Pub. Date: Dec. 7, 2017

(65) Prior Publication Data
US 2020/0327368 A1 Oct. 15, 2020

(30) Foreign Application Priority Data

Jun. 2, 2016 (JP) .............................. JP2016-110736

(51) Int. Cl.
*G06K 9/00* (2006.01)
*G06K 9/46* (2006.01)
(Continued)

(52) U.S. Cl.
CPC ....... *G06K 9/00268* (2013.01); *G06K 9/4642* (2013.01); *G06K 9/6232* (2013.01); *G06F 17/16* (2013.01); *G06F 17/18* (2013.01)

(58) Field of Classification Search
None
See application file for complete search history.

(56) References Cited

U.S. PATENT DOCUMENTS

| 2008/0187213 | A1* | 8/2008 | Zhang | G06K 9/00281 |
| | | | | 382/159 |
| 2017/0083751 | A1* | 3/2017 | Tuzel | G06K 9/00302 |
| 2017/0213359 | A1* | 7/2017 | Zhou | G06K 9/6277 |

OTHER PUBLICATIONS

Xuehan et al., "Supervised Descent Method and its Applications to Face Alignment", IEEE International Conference on Computer Vision and Pattern Recognition (CVPR), The Robotics Institute, Carnegie Mellon University, May 2013, p. 1-8.

* cited by examiner

*Primary Examiner* — Justin P. Misleh
(74) *Attorney, Agent, or Firm* — Harness, Dickey & Pierce, P.L.C.

(57) ABSTRACT

A feature point position estimation device is provided. The feature point position estimation device includes a subject detection section for detecting a subject region from a subject image, a feature point positioning section for positioning a feature point at a preliminarily prepared initial feature point position with respect to the subject region, a feature amount acquisition unit for acquiring a feature amount of the feature points arranged, a regression calculation unit for calculating a deviation amount of a position of a true feature point with respect to the position of the feature point by performing a regression calculation on the feature amount, and a repositioning unit for repositioning the feature points based on the deviation amount. The regression calculation unit calculates the deviation amount by converting the feature amount in a matrix-resolved regression matrix.

10 Claims, 18 Drawing Sheets

(51) Int. Cl.
*G06K 9/62* (2006.01)
*G06F 17/16* (2006.01)
*G06F 17/18* (2006.01)

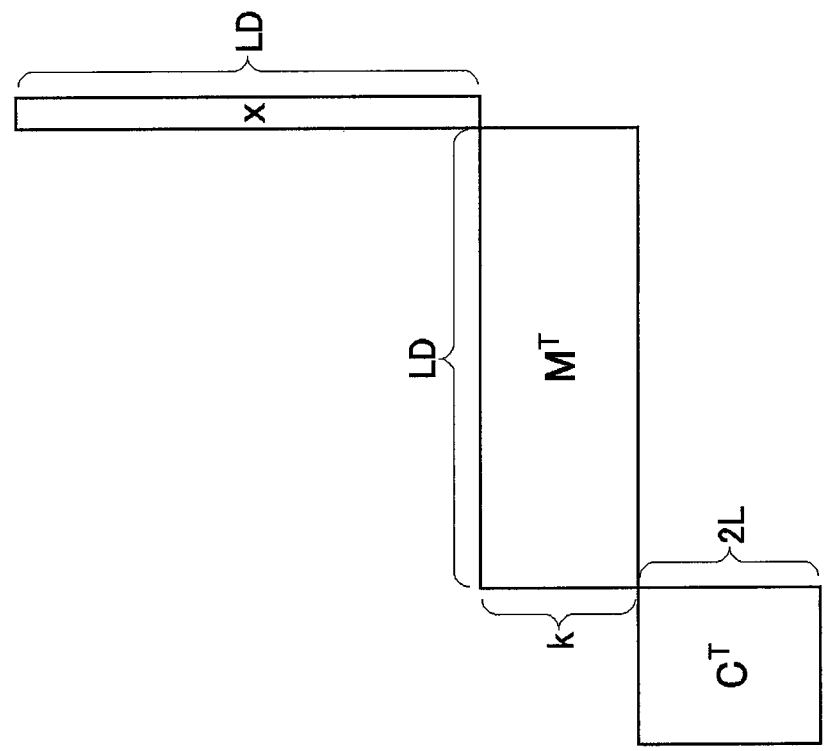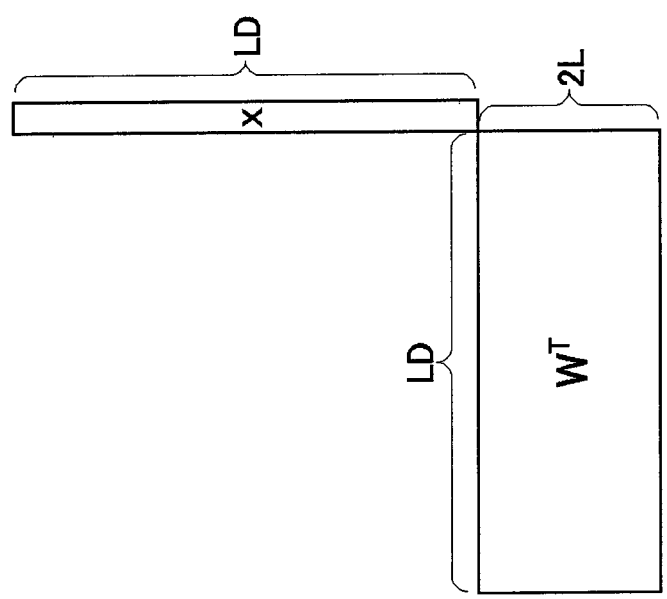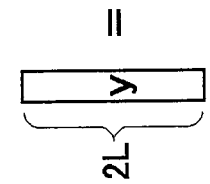
FIG. 2

FEATURE POINT ESTIMATION DEVICE, FEATURE POINT POSITION ESTIMATION METHOD, AND COMPUTER-READABLE MEDIUM

CROSS REFERENCE TO RELATED APPLICATIONS

This application is a U.S. National Phase Application under 35 U.S.C. 371 of International Application No. PCT/JP2017/018954 filed on May 22, 2017. This application is based on and claims the benefit of priority from Japanese Patent Application No. 2016-110736 filed on Jun. 2, 2016. The entire disclosures of all of the above applications are incorporated herein by reference.

TECHNICAL FIELD

The present disclosure relates to a feature point estimation device, a feature point estimation system, a feature point estimation method, and a feature point estimation program for estimating a position of a feature point in an image.

BACKGROUND

Conventionally, a technique called SDM (Supervised Descent Method) is known as a feature point position estimation technique for estimating the position of a feature point in an image.

By estimating the feature point position by SDM, it is possible to estimate a position of a facial organ by using a facial organ point of the face as a feature point in a facial image (for example, Non-Patent Document 1), and estimate a position of each person's joint by using a person's joint point as a feature point in a portrait image. It is possible to estimate positions of left and right white lines on the road in the vehicle camera image by using the left and right white lines as feature points. Then, for example, by estimating the position of the organ point of the face in the face image, it is possible to estimate the inattentive or abnormal state of the driver during driving, and give an appropriate warning.

FIGS. 12 to 19 are diagrams for explaining procedures of estimating the organ point position of the face by the conventional SDM. SDM is an algorithm consisting of two stages of "feature extraction" and "linear regression".

(Step 1: Face Area Detection)

First, as shown in FIG. 12, a rectangular face region is detected from a face image by an arbitrary face detection method. An arbitrary method can be used for the face region detection, and it is possible to use, for example, a method based on Viola-Jones or a method by SPADE (Scalar Product Accelerator by Integer Decomposition for Object Detection, Mitsuru Ambai and Ikuro Sato, ECCV 2014).

(Step 2: Positioning of Average Organ Points)

Next, with respect to the detected face region, as shown in FIG. 13, average organ points are positioned as an initial position at average organ point positions. The average organ point positions are obtained in advance by giving correct data of the organ points (for example, the inner corner of the eyes, the top of the nose, mouth etc.) for a large number of face images and taking the average thereof. Here, it is assumed that L average organ points are prepared.

(Step 3: Feature Amount Extraction)

Next, as shown in FIG. 14, the feature amount in a D dimension are extracted from a periphery of the placed L pieces of facial organ points. Here, the feature amount may be anything, for example, HOG (Histograms of Oriented Gradient) feature amount can be used. Then, as shown in FIG. 14, a feature vector x1 of the LD dimension in which the feature amount of all the organ points are integrated is generated.

(Step 4: Calculation of Difference Vector by Regression)

Next, as shown in FIG. 15, a difference vector $y_1$ is obtained by transforming the feature vector $x_1$ with the regression matrix $W_1$. In the regression matrix $W_1$, the feature vector $x_1$ is an input, and the difference vector $y_1$ indicating a deviation amount of a true organ point position with respect to the average organ point is an output. For a large number of face images, it can be obtained by performing machine learning using a linear regression technique. The difference vector $y_1$ is a 2 L dimension obtained by multiplying the number L of organ points by the number (2) of coordinate values of each organ point, and the regression matrix $W_1$ is obtained as a matrix of 2 L row LD columns.

(Step 5: Repositioning of Organ Points)

Next, as shown in FIG. 16, the positioning of the average organ points used in Step 2 is corrected by the difference vector $y_1$ obtained in Step 4, whereby the organ points are repositioned.

Regarding the repositioned organ points, step 3 is executed again to extract the feature amount, whereby the feature vector $x_2$ is obtained as shown in FIG. 17, and step 4 is executed to extract the feature vector $x_2$ by the regression matrix $W_2$, whereby as shown in FIG. 18, the difference vector $y_2$ dis obtained, and further step 5 is executed to rearrange the organ points, whereby as shown in FIG. 19, rearranged organ points are obtained. By repeating the extractions of the feature amount and the repositioning by the regression (from Step 3 to Step 5) about 4 to 5 times in this manner, accurately positioned organ points can be obtained.

As described above, by using the method of SDM for the face image, as shown in FIG. 20, it is possible to obtain information (coordinates) on the positions of a plurality of organ points, which are feature points of the face, from the face image.

PRIOR ART DOCUMENT

Non-Patent Document 1: Supervised Descent Method and its Applications to Face Alignment, Xuehan Xiong, Fernando De la Torre (CVPR 2013)

SUMMARY OF THE INVENTION

However, in the above-described conventional SDM, there is a problem that the memory consumption is large. That is, if the number of organ points is L and the number of dimensions of feature amount is D, the regression matrix Wi is 2 L row LD columns. If the number of bytes of floating point of each element of the regression matrix Wi is B bytes, 2 L×LD×B bytes of memory are consumed. Then, the memory of this capacity is consumed by the number of times of iterative processing of the organ point estimation.

For example, when the number of organ points is 194, the feature amount is 288 dimensions, and the elements of the regression matrix are double precision real numbers (8 bytes), the memory consumed for one regression matrix is 194×2×194×288×8=About 173 Mbytes, and assuming that the number of repetition processing is four, memory of about 694 M bytes is consumed.

In the face recognition by the conventional SDM, there was another problem that the speed was slow. In particular, the load of the process (step 4) of performing the inner product calculation of the feature vector xi and the regression matrix Wi to obtain the difference vector yi is large (the order of the computational amount is 2 L×LD), and it takes time because the process is repeated by the number of iterations.

An object of the present disclosure is to provide a feature point position estimation device capable of suppressing memory consumption and calculation amount in the feature point position estimation processing that repeats feature amount acquisition and regression calculation, in view of the above problem.

A feature point position estimation device according to an embodiment of the present disclosure includes an subject detection unit that detects a subject region from a subject image, a feature point positioning unit that, with respect to the subject region, positions feature points at preliminarily prepared initial feature point positions, a feature amount acquisition unit that acquires a feature amount of the positioned feature point, a regression calculation unit that, by carrying out a regression calculation with regard to the feature amount, computes a deviation amount of a true feature point position with respect to the feature point position, a repositioning unit that repositions the feature points based on the deviation amount. The feature amount acquisition unit acquires feature points arranged in the feature point positioning unit and feature amount of feature points repositioned in the repositioning unit. The regression calculation unit calculates the amount of deviation by transforming the feature amount in a matrix-resolved regression matrix. The repositioning unit outputs positions of the repositioned feature points by repeating a plurality of times acquisition of a feature amount by the feature amount acquisition unit, calculation of the amount of deviation by the regression calculation unit, and reposition of the feature points.

The regression matrix may be decomposed into a basis matrix that is a real number matrix and a coefficient matrix that is a real number matrix. Specifically, the regression matrix may be decomposed into the basis matrix and the coefficient matrix by singular value decomposition.

The regression matrix may be decomposed into a basis matrix which is an integer matrix and a coefficient matrix which is a real number matrix. Here, the basis matrix may be a binary matrix or a ternary matrix. Also, in the regression matrix, each column vector may be decomposed individually, or may be collectively decomposed in a matrix.

The feature point position estimating device may estimate the positions of the feature points with respect to the subject image of a plurality of consecutive frames. The feature point positioning unit repeats the feature amount acquisition by the feature amount acquisition unit in the frame, the calculation of the degree of deviation by the regression calculation unit, and the rearrangement of the feature points a plurality of times, so that the rearrangement feature points may be set as the initial feature point positions prepared in advance in the current frame. With this configuration, since the number of regression can be reduced, the amount of computation until convergence can be reduced.

The feature point position estimation device may further include an evaluation unit that linearly converts the feature amount of the feature point repositioned by the repositioning unit to obtain a score of the feature point. With this configuration, it is possible to judge whether the estimation of the position of the feature point failed or not by evaluating the score.

The evaluation unit may group the plurality of feature points repositioned by the repositioning unit, and obtain the score for each group. Compared with the case of assigning scores to each feature point, reliability of the part estimated by the grouped score can be determined, so robust reliability estimation can be performed.

The regression calculation unit performs the regression calculation only for some of the feature points with a high priority among the plurality of feature points. The acquisition of the feature amount by the feature amount acquisition unit, the calculation of the amount of deviation by the regression calculation unit, and the reposition of the feature point are repeated a plurality of times. The number of feature points for which the regression calculation is performed may be increased according to the priority and the regression calculation may be performed for all the feature points. With this configuration, the amount and number of regression calculations can be reduced, and the calculation cost can be reduced.

The subject detection unit may detect the subject region by extracting a characteristic amount from each of the plurality of blocks of the subject image and performing an identification process, and the feature amount acquisition unit may obtain the feature amount extracted in the subject detection unit as the feature amount of the feature point. At this time, the feature amount acquisition unit may acquire the feature amount of the block to which the feature point belongs as the feature amount of the feature point.

A feature point position estimation device according to an embodiment of the present disclosure includes an subject detection unit that detects a subject region from a subject image, a feature point positioning unit that, with respect to the subject region, positions feature points at preliminarily prepared initial feature point positions, a feature amount acquisition unit that acquires a feature amount of the positioned feature point, a regression calculation unit that, by carrying out a regression calculation with regard to the feature amount, computes an amount of deviation of a true feature point position with respect to the feature point position, a repositioning unit that repositions the feature points based on the amount of deviation. The feature amount acquisition unit acquires feature points arranged in the feature point positioning unit and feature amount of feature points rearranged in the repositioning unit. The regression calculation unit calculates the amount of deviation by transforming the feature amount in a matrix-resolved regression matrix. The repositioning unit outputs positions of the repositioned feature points by repeating a plurality of times acquisition of a feature amount by the feature amount acquisition unit, calculation of the degree of deviation by the regression calculation unit, and repositioning of the feature points.

A feature point position estimation system according to an embodiment of the present disclosure is executed by a computer. The computer functions as an subject detection unit that detects a subject region from a subject image, a feature point positioning unit that, with respect to the subject region, positions feature points at preliminarily prepared initial feature point positions, a feature amount acquisition unit that acquires a feature amount of the positioned feature point, a regression calculation unit that, by carrying out a regression calculation with regard to the feature amount, computes an amount of deviation of a true feature point position with respect to the feature point position, a repositioning unit that repositions the feature points based on the amount of deviation. The feature amount acquisition unit acquires feature points arranged in the feature point positioning unit and feature amount of feature points rearranged in the repositioning unit. The regression calculation unit calculates the amount of deviation by transforming the feature amount in a matrix-resolved regression matrix. The repositioning unit outputs positions of the repositioned feature points by repeating a plurality of times acquisition of a feature amount by the feature amount acquisition unit, calculation of the degree of deviation by the regression calculation unit, and rearrangement of the feature points.

A feature point position estimation method according to an embodiment of the present disclosure includes an subject detection step that detects a subject region from a subject image, a feature point positioning step that, with respect to the subject region, positions feature points at preliminarily prepared initial feature point positions, a feature amount acquisition step that acquires a feature amount of the positioned feature point, a regression calculation step that, by carrying out a regression calculation with regard to the feature amount, computes an amount of deviation of a true feature point position with respect to the feature point position, a repositioning step that repositions the feature points based on the amount of deviation. The feature amount acquisition step acquires feature points arranged in the feature point positioning unit and feature amount of feature points rearranged in the repositioning unit. The regression calculation step calculates the amount of deviation by transforming the feature amount in a matrix-resolved regression matrix. The repositioning step outputs positions of the repositioned feature points by repeating a plurality of times acquisition of a feature amount by the feature amount acquisition step, calculation of the degree of deviation by the regression calculation step, and rearrangement of the feature points.

In the feature point position estimation device and the like, since the regression matrix used for the regression calculation is matrix-partitioned in the feature point position estimation processing in which the feature amount acquisition and the regression calculation are repeated, the memory consumption amount and the calculation amount can be reduced.

BRIEF DESCRIPTION OF DRAWINGS

The above and other aspects, features and advantages of the present disclosure will become more apparent from the following detailed description made with reference to the accompanying drawings. In the drawings:

FIG. 2 is a diagram for explaining matrix decomposition of a regression matrix W in the embodiment;

DETAILED DESCRIPTION

Hereinafter, a plurality of embodiments will be described with reference to the drawings. Embodiments described below are merely examples, and the embodiments are not limited to the specific configurations described below. To embody the technical idea of the present disclosure, a specific configuration according to the embodiment may be appropriately adopted.

Figure 1:
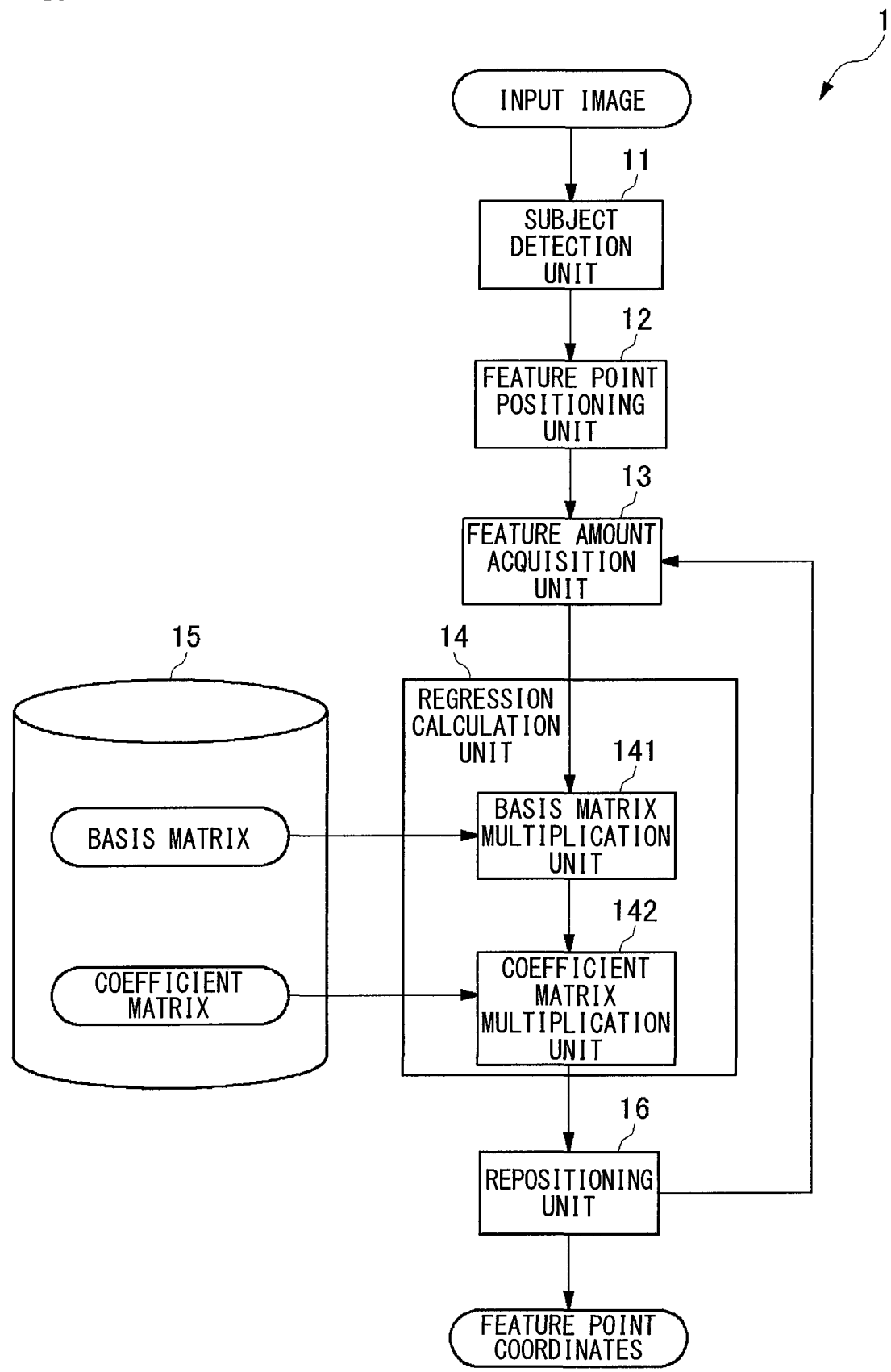
FIG. 1 is a block diagram showing a configuration of a feature point position estimation device in an embodiment.

FIG. 1 is a block diagram showing a configuration of a feature point position estimation device 1 in an embodiment. As shown in FIG. 1, the feature point position estimation device 1 includes a subject detection unit 11, a feature point positioning unit 12, a feature amount acquisition unit 13, a regression calculation unit 14, a matrix storage unit 15, a repositioning unit 16. The feature point position estimation device 1 can be realized by a computer having a CPU, a ROM, a RAM, an auxiliary storage device, an input/output interface, etc., in which a feature point location estimation program is executed. It should be noted that the feature point position estimation system having same functions as that of the feature point position estimation device 1 may be configured by arranging the components of the feature point position estimation device 1 in a distributed manner and communicating with each other.

In the feature point position estimation device 1 according to the present embodiment, the feature point position is estimated by SDM that iterates (repeats) the feature amount acquisition and the linear regression four times, but the iteration number of times is not limited to four times, and it may be more or less.

An image (subject image) to be estimated of the position of the feature point is input to the subject detection unit 11. The subject detection unit 11 detects a subject region from the subject image in the same manner as in step 1 of the above-described conventional SDM. An arbitrary method can be used for this subject region detection. For example, in the case of detecting a face, it is possible to use a method based on Viola-Jones or a method based on SPADE.

In the same manner as in the above-described step 2 of the conventional SDM, the feature point positioning unit 12 positions feature point at an average feature point position prepared in advance as an initial feature point position with respect to the subject region detected by the subject detection unit 11 (The feature point positioned in this way is also referred to as "average feature point"). The average feature point position is obtained in advance by giving correct answer data of feature points for a large number of subject images and taking the average of them. Here, it is assumed that L average organ points are prepared. It should be noted that the initial feature point position is not necessarily determined as the position of the average feature point, but may be given by any other arbitrary method.

In the same manner as in step 3 of the above-described conventional SDM, the feature amount acquisition unit 13 extracts a D-dimensional feature amount from a periphery of the feature points (for example, a small region of a 32×32 pixel which is centered on the feature point) for the L feature points arranged in the image of the subject region (the subject region image). Here, the feature amount may be anything, for example, HOG (Histograms of Oriented Gradient) feature amount can be used. Then, the feature amount acquisition unit 13 generates a feature vector xi of LD dimension obtained by integrating feature amount of all feature points (i is the iterative processing number of SDM).

Specifically, the feature amount acquisition unit 13 extracts the feature amount from the subject region image in which the average feature point is positioned by the subject detection unit 11, and generates the feature vector xi. Furthermore, when the subject region image in which the feature points are repositioned from the repositioning unit 16 is input, the feature amount is extracted and a feature vector xi is generated each time in the same manner as described above.

The regression calculation unit 14 obtains the difference vector yi by transforming the feature vector xi with the matrix-decomposed regression matrix Wi. The regression matrix Wi is a transformation matrix for converting the feature vector xi into the vector yi, and in the regression matrix Wi the feature vector xi is input, and a vector yi of the amount of deviation of the position of the true feature point relative to the average feature point is output. For a large number of subject images, it is obtained by performing machine learning using the linear regression technique.

The regression calculation unit 14 of the present embodiment decomposes the regression matrix Wi obtained as described above into a basis matrix Mi and a coefficient matrix Ci and uses them. For this purpose, as shown in FIG. 1, the regression calculation unit 14 includes a basis matrix multiplication unit 141 and a coefficient matrix multiplication unit 142. The basis matrix multiplication unit 141 performs multiplication (takes a product) of the feature vector xi and the basis matrix Mi. The coefficient matrix multiplication unit 142 performs multiplication (takes a product) of the product Mxi of the feature vector xi and the basis matrix Mi, and the coefficient matrix Ci.

In this way, as shown in FIG. 2, the regression calculation unit 14 of the present embodiment decomposes the regression matrix Wi into two matrices and calculates the product with the feature vector xi. As described above, in the SDM, the positions of a plurality of feature points in the subject region image are estimated, but among the plurality of feature points estimated in this way, there are many feature points located close to each other. When the positions of the feature points are close to each other, each column vector wi of the regression matrix Wi resembles each other. When the regression matrix Wi has such characteristics, there is a property that when decomposing it to the base matrix and the coefficient matrix, an approximation can be obtained with a smaller number of basis numbers.

Since the regression matrix is decomposed into two small matrices, memory consumption is reduced and computational complexity is also reduced. That is, conventionally, (2 L×LD) calculations are required for the calculation of the product of the regression matrix (2 L row LD column) and the feature vector (LD dimension), whereas as shown in FIG. 2, it is enough to calculate (K×LD+2 L×k) times, when the regression matrix W is decomposed into the basis matrix M with the basis number k and the coefficient matrix C. For example, in the case of L=194, D=288, and double precision real number (8 bytes), about 165 M bytes of memory were consumed for one regression matrix W, but when decomposed as shown in FIG. 2, (0.05×k) M bytes of memory consumption will be enough.

The matrix storage unit 15 stores the basis matrix Mi and the coefficient matrix Ci obtained by decomposing the regression matrix Wi. i is the number of iterative processing, and i is 1 to 4 in the present embodiment. The decomposition method of the regression matrix Wi will be described later.

In the case of i=1, the repositioning unit 16 corrects the position of the average feature point arranged by the average feature point positioning unit 12 with the difference vector y1 obtained by the regression calculation unit 14, thereby repositioning the feature point. When i is 2 or more, the repositioning unit 16 repositions the feature points by correcting the position of the feature point obtained at that time point with the difference vector yi obtained by the regression calculation unit 14.

The feature points repositioned by the repositioning unit 16 are output to the feature amount acquisition unit 13 for iterative processing. The feature amount acquisition unit 13 extracts the feature amount from the repositioned feature point to obtain the feature vector x2. The regression calculation unit 14 performs the regression calculation to obtain the difference vector y2. The repositioning unit 16 repositions the feature points by using the difference vector y2, thereby obtaining repositioned feature points. As described above, the feature amount extraction and the reposition by the regression (the processing of the feature amount acquisition unit 13, the regression calculation unit 14, and the repositioning unit 16) are repeated, and i is incremented. When i is 4, the scheduled number of the iterative processing is terminated. Thereafter, the repositioning unit 16 outputs the position information (feature point coordinates) of each feature point positioned at that time.

Several embodiments of the decomposition of the regression matrix W and the regression calculation in the regression calculation unit 14 will be described below. The decomposition of the regression matrix is generally executed beforehand by a device (hereinafter referred to as "matrix decomposition device") different from the feature point position estimation device 1. The basis matrix M and the coefficient matrix C generated thereby are stored in the matrix storage unit 15 of the feature point position estimation device 1.

First Embodiment

Figure 3:
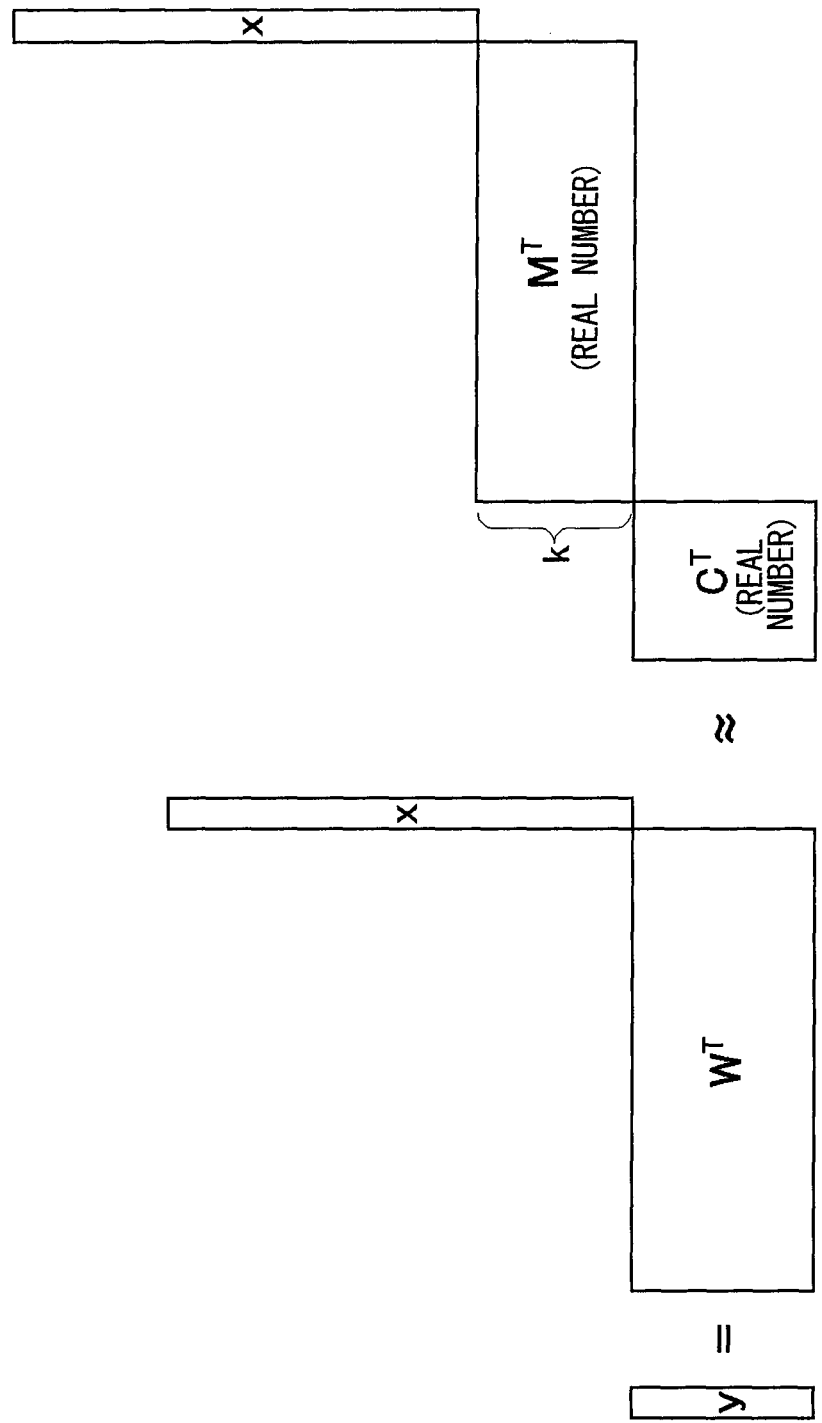
FIG. 3 is a diagram for explaining a process of decomposing the regression matrix W in a first embodiment into a basis matrix M with a basis number k and a coefficient matrix C.

FIG. 3 is a diagram for explaining the process of decomposing the regression matrix W into the basis matrix M with the basis number k and the coefficient matrix C according to the first embodiment. In this example, the matrix decomposition device decomposes the regression matrix W into two real matrices. More specifically, the matrix decomposition device decomposes the regression matrix W into real base matrices of an orthogonal basis and real coefficient matrices by singular value decomposition.

When the positions of the feature points are close to each other, the regression matrix W tends to be ranked low, and if the regression matrix W is low rank, decomposition into a small matrix (small base number k) can be expected. As described above, it is possible to reduce the calculation amount and the memory consumption by reducing the base number k.

Second Embodiment

Figure 4:
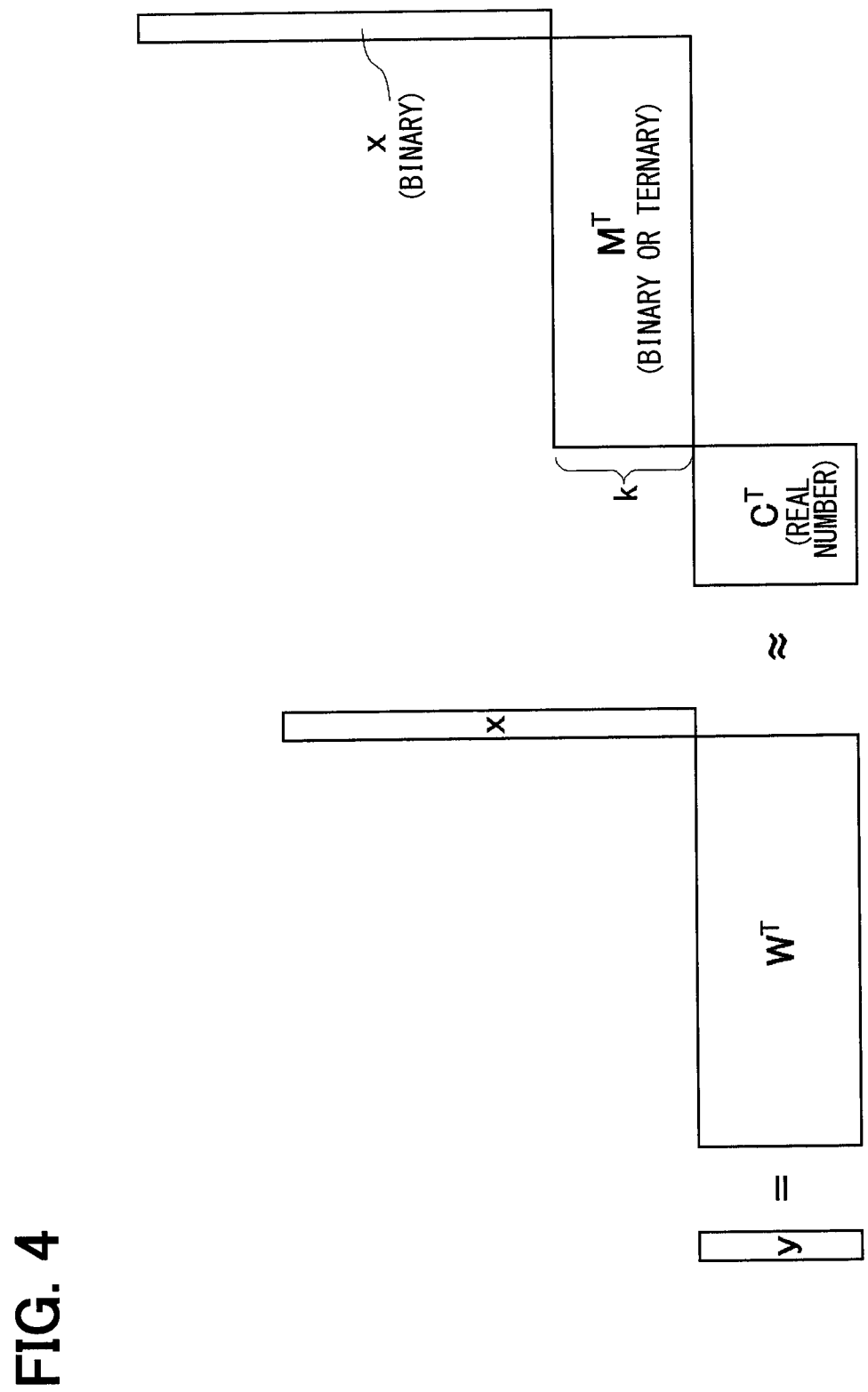
FIG. 4 is a diagram for explaining a process of decomposing a regression matrix W in a second embodiment into a basis matrix M with a basis number k and a coefficient matrix C.

FIG. 4 is a diagram for explaining the process of decomposing the regression matrix W into the basis matrix M with the basis number k and the coefficient matrix C according to the second embodiment. In this example, the matrix decomposition device decomposes the regression matrix W into an integer basis matrix M and a real number coefficient matrix C. More specifically, the matrix decomposition device decomposes the regression matrix W into a binary or ternary basis matrix M and a real number coefficient matrix C. When the basis matrix M and the coefficient matrix C are used, the feature amount extracted for the feature point in the feature amount acquisition unit 13 of the feature point position estimation device 1 is also binary.

Since the floating-point operation does not occur in the operation Mx of the product of the basis matrix M and the feature vector x by setting the feature vector x as an integer, regression calculation can be performed at high speed. In particular, when the basis matrix M is binary, it is only necessary to take the exclusive OR (XOR) and count the number of bits. If the basis matrix M is ternary, it is only necessary to take the exclusive OR (XOR) and a logical product (AND) and count the number of bits. Therefore, it is possible to perform regression calculation at a very high speed.

Hereinafter, a method of decomposing into the binary basis matrix and the real number coefficient matrix by the matrix decomposition device of the present embodiment will be described more specifically.

(First Decomposition Technique)

As the first decomposition technique, a data-independent decomposition technique will be described. In the first decomposition technique, the matrix decomposition device decomposes by solving a cost function g1 shown in the following expression expressing the decomposition error.

$$g_1(C,M) = \|W - CM\|_F^2 \quad \text{[Formula 1]}$$

However, the basis matrix M is binary. $M \in \{-1, 1\}^{DL \times k}$

Specifically, the matrix decomposing device solves the cost function g1 by following steps.
(1) The base matrix M and the coefficient matrix C are randomly initialized.
(2) By fixing elements of the basis matrix M and optimizing elements of the coefficient matrix C by the method of least squares, the elements of the coefficient matrix C are updated so as to minimize the cost function g1.
(3) By fixing the elements of the coefficient matrix C, the elements of the basis matrix M are updated in the full search so as to minimize the cost function g1.
(4) Steps (2) and (3) are repeated until convergence. For example, when the cost function g1 satisfies a predetermined convergence condition (for example, the decrease amount is equal to or less than a certain value), it is determined that the convergence has occurred. (5) The solutions obtained in steps (1) to (4) are held as candidates. (6) By repeating steps (1) to (5), the candidate basis matrix M and the candidate coefficient matrix C with the smallest cost function g1 are adopted as final result. Although it is not necessary to repeat steps (1) to (5), it is possible to avoid the problem of initial value dependence by repeating them a plurality of times.

Next, update processing of the basis matrix M in step (3) will be described. The element of the row vector at the j-th row of the basis matrix M depends only on the element at the j-th row of the regression matrix W. Therefore, since the value of each row vector of the basis matrix M can be optimized independently of other rows, the basis matrix M can perform an exhaustive search (full search) for each row. In the case of binary decomposition, as in the present embodiment, there are only $2^k$ (two to the power of k) kinds of row vectors in the j-th row of the basis matrix M (in the case of ternary decomposition as well, there are only $3^k$ (three to the power of k) kinds of row vectors). Therefore, all of row vectors are comprehensively checked and the row vector that minimizes the cost function g1 is adopted. This is applied to all of the row vectors in the basis matrix M so as to update the elements of the basis matrix M.

(Second Decomposition Technique)

As the second decomposition technique, a data independent type decomposition technique for making the coefficient matrix C sparse will be described. In the second decomposition technique, the matrix decomposition device decomposes by solving the cost function g2 shown in the following expression expressing the decomposition error.

$$g_2(C,M) = \|W - CM\|_F^2 + \lambda |C|_1 \quad \text{[Formula 2]}$$

However, the basis matrix M is binary, and $M \in \{-1, 1\}^{DL \times k}$. Also, $|C|_1$ is L1 norm of the elements of the coefficient matrix C, and $\lambda$ is its coefficient.

The matrix decomposing device solves the cost function g2 by the following steps.
(1) The base matrix M and the coefficient matrix C are randomly initialized.
(2) By fixing the elements of the basis matrix M, and the elements of the coefficient matrix C is optimized by the proximity gradient method.
(3) By fixing the elements of the coefficient matrix C, the elements of the basis matrix M are updated in the full search so as to minimize the cost function g2.
(4) Steps (2) and (3) are repeated until convergence. For example, when the cost function g2 satisfies a predetermined convergence condition (for example, the decrease amount is equal to or less than a certain value), it is determined that the convergence has occurred.
(5) The solutions obtained in steps (1) to (4) are held as candidates.
(6) By repeating steps (1) to (5), the candidate basis matrix M and the candidate coefficient matrix C with the smallest cost function g2 are adopted as final results. Although it is not necessary to repeat steps (1) to (5), it is possible to avoid the problem of initial value dependence by repeating them a plurality of times.

According to the second decomposition technique, the coefficient matrix C can be made sparse. By making the coefficient matrix C sparser, it is possible to omit the part related to the zero element of the coefficient matrix C in the calculation of the product CM, and it is possible to calculate inner product at a higher speed.

(Third Decomposition Technique)

Next, a third decomposition technique will be described. In the first decomposition technique, a decomposition error (refers to formula 3) is defined as the cost function g1, and this decomposition error is minimized.

$$\|W - CM\|_F^2 \quad \text{[Formula 3]}$$

However, the regression matrix W is approximated to the product of the basis matrix M and the coefficient matrix C. It is the product $W^T x$ of the feature vector x and the regression matrix W that actually approximates after that.

Therefore, in the third decomposition technique, S number of sample feature vectors x are collected beforehand, and the sum of these is $P \in R^{DL \leq S}$. Then, we define the decomposition error as below and minimize it.

$$\|W^T x - (CM)^T x\|_F^2 \quad \text{[Formula 4]}$$

That is, in the third decomposition technique, the matrix decomposition device decomposes by solving the cost function g3 of the following expression.

$$g_3(C,M) = \|W^T X - (C,M)^T X\|_F^2 \quad \text{[Formula 5]}$$

According to the cost function g3, since the regression matrix W is decomposed according to the distribution of actual data, approximation accuracy in decomposition is improved.

This approximate decomposition can be performed by sequentially determining the basis vectors mj constituting the basis matrix M. The procedure of the third decomposition technique is as follows. (1) The basis matrix M and the coefficient matrix C are obtained by the first or second decomposition technique, and these are used as their initial values. (2) By fixing the elements of the basis matrix M, the elements of the coefficient matrix C is optimized by the proximity gradient method. (3) By fixing the elements of the coefficient matrix C and optimizing the elements of the basis matrix M, the elements of the basis matrix M are updated. The process of updating the basis matrix M will be described later. (4) Steps (2) and (3) are repeated until convergence and hold the basis matrix M and coefficient matrix C with the cost function g3 minimized are held as candidates. (5) By repeating steps (1) to (4), the basis matrix M and the coefficient matrix C with the smallest cost function g3 are adopted as final result. In the step (1), since the base matrix M and the coefficient matrix C are optimized by the first or second decomposition technique again, the initial value is changed. Although it is not necessary to repeat step (5), it is possible to avoid the problem of initial value dependence by repeating them a plurality of times.

Next, update processing of the basis matrix M in step (3) will be described. In the case of data dependent decomposition, the value of the row vector of the basis matrix M is no longer independent of other rows and depends on them. Since the elements of the basis matrix M are binary or ternary, namely discrete values, optimization of the basis matrix M is a combinatorial optimization problem. Therefore, algorithms such as Greedy algorithm, Tabu search, Simulated annealing, etc., can be used for optimization of the basis matrix M, for example. Since good initial values are obtained in step (1), these algorithms can also satisfactorily minimize the decomposition error.

For example, when the greedy algorithm is used, the basis matrix M is optimized by the following steps. (3-1) T elements are randomly selected from the elements of the basis matrix M. (3-2) $2^T$ combinations ($3^T$ combinations in the case of three-valued decomposition to be described later) are tested and adopt one combination with the cost function g3 minimized. (3-3) Repeat step (3-1) and step (3-2) until converge.

(Fourth Decomposition Technique)

The fourth decomposition technique is a combination of the second decomposition technique and the third decomposition technique. Specifically, decomposition is performed by solving the cost function g4 of the following equation.

$$g_4(C,M) = \|W^T X - (CM)^T X\|_F^2 + \lambda \|C\|_1 \quad \text{[Formula 6]}$$

According to this cost function g4, since the regression matrix W is decomposed according to the distribution of actual data, approximation accuracy in decomposition is improved and the coefficient matrix C can be made sparse. That is, it is possible to obtain both merits of the second decomposition technique and merits of the third decomposition technique. The specific decomposition procedure is the same as the third decomposition technique.

In the decomposition of the second embodiment, since the regression matrices W are collectively decomposed at once, it becomes difficult to decompose when the number k of basis increases. Therefore, in the present embodiment, the real number matrix may be sequentially decomposed by the following algorithm.

Figure 5:
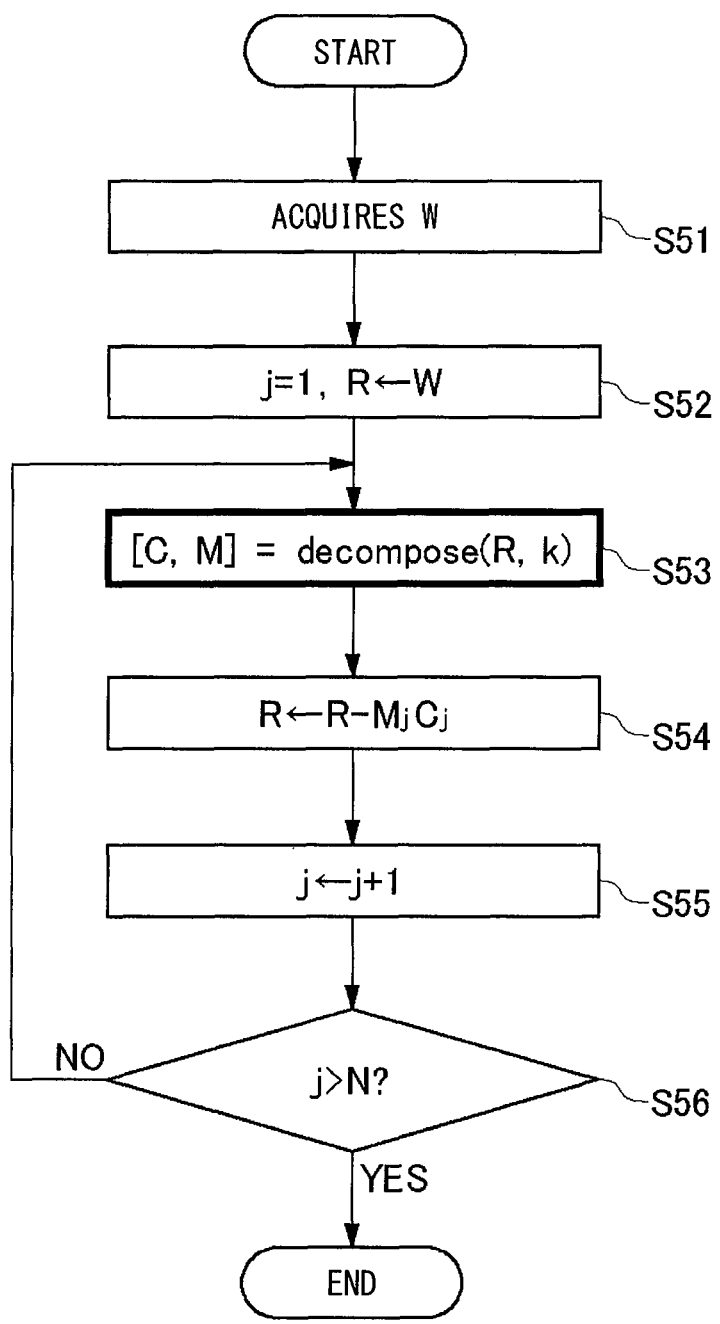
FIG. 5 is a flowchart of an algorithm that is implemented in the division method in the second embodiment.

FIG. 5 is a flowchart of an algorithm that is implemented in the division method in the present embodiment; In the following explanation, the procedure of decomposing the regression matrix W into a basis matrix M having k bases and a coefficient matrix C by the decomposition method described in the first or second embodiment is expressed by the following equation.

$$[C,M] = \text{decompose}(W,k) \quad \text{[Formula 7]}$$

First, the matrix decomposition device acquires a regression matrix W to be decomposed (step S51). Next, the matrix decomposition device assigns the index j (j=1 to N) to 1 and substitutes the regression matrix W into the residual matrix R (step S52). The residual matrix R is the difference between the sum of the inner products of the basis matrix Mj and the coefficient matrix Cj, which are decomposed so far by the sequential decomposition, and the regression matrix W.

Next, the matrix decomposition device decomposes the residual matrix R into the basis matrix M and the coefficient matrix C by the technique of the first or second embodiment (step S53). At this time, the number of basis is kj. The number of bases (kj=k1, k2, . . . , $K_N$) is stored in the matrix decomposition device in advance. When MjCj is obtained, the matrix decomposition device sets the difference between the original residual matrix R and MjCj as a new residual matrix R (step S54), increments the index j (step S55). The matrix decomposition device determines whether the index j is larger than N, that is, whether sequential decomposition of N stages has ended (step S56).

When the index j is equal to or less than N (NO in step S56), the matrix decomposition device returns to step S53, and decomposes again the new residual matrix R obtained in step S54 with a new j incremented in step S55. By repeating the above process, when the index j becomes larger than N (YES in step S56), the process is terminated. As described above, the number of bases (kj=k1, k2, . . . , $K_N$) of N stages is prepared in advance, and they may be the same number or different numbers from each other. Further, the number of bases k may be, for example, about 8.

According to the present embodiment, the more the number of bases k of decomposition is increased, the closer to the original accuracy can be made.

Third Embodiment

Figure 6:
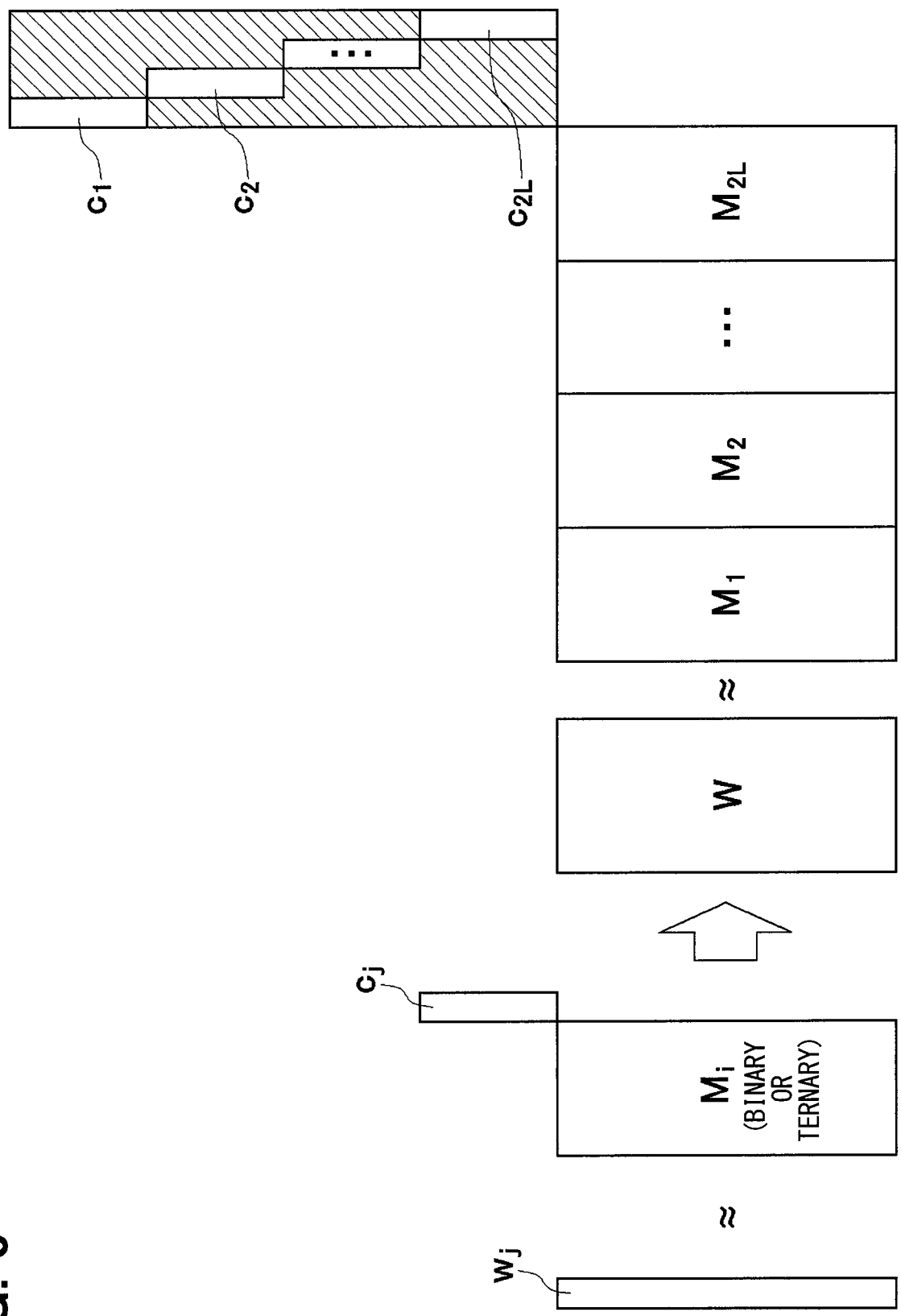
FIG. 6 is a diagram for explaining matrix decomposition of a regression matrix W in a third embodiment.

FIG. 6 is a diagram for explaining matrix decomposition of a regression matrix W in the third embodiment; In the present embodiment, as shown in FIG. 6, vectors in the j-th column of the regression matrix W are separately decomposed and collected. By decomposing each vector in this way, it is possible to suppress the calculation cost of decomposition. Individual vectors may be decomposed according to the procedure described in the second embodiment.

In the following description, the column vector in the j-th column of the regression matrix W is denoted as wj, and the column vector in the j-th column of the coefficient matrix C is denoted as cj. In the present embodiment, the regression matrix W obtained by arranging a plurality of real number vectors wj is decomposed into a sum of product of a plurality of basis matrices Mj and a matrix obtained by arranging a plurality of coefficient vectors cj diagonally as shown in FIG. 6. In FIG. 6, 0 (zero) is entered in the hatched portion of the matrix.

Fourth Embodiment

This embodiment is applied to a case, where subject images to be estimated for feature point positions are obtained as a plurality of consecutive frames. In the intermediate stage of the process of repeating the feature amount extraction and the regression calculation in the previous frame, the feature amount acquisition unit 13 of the present embodiment sets the feature point position obtained in the repositioning unit 16 as the initial feature point position so as to extract the feature amount and to start the regression calculation.

The present embodiment can be effectively applied especially when the change of the image is small between the previous frame and the current frame, and according to this embodiment it is possible to reduce the number of iterations of the feature amount extraction and the regression calculation, and to reduce the calculation amount until convergence.

Fifth Embodiment

In addition to the configuration of the feature point estimation device of the above embodiment, the feature point position estimation device according to the present embodiment has further an evaluation unit (not shown) which calculates a score (probability) for determining whether the estimation of the feature point position is successful. By repeating the extraction of the feature amount by the feature amount acquisition unit 13 and the repetition of the regression calculation by the regression calculation unit 14, the organ point position is obtained.

The evaluation unit extracts feature amount from L 'feature points selected from the obtained feature point positions, and obtains a vector x' in the L 'D dimension. Based on the vector x' a score is obtained by applying the linear transformation of $s = w^T x'$. In this case, (A) score may be added for each feature point (L'=1), (B) all the feature points are regarded as one group and one score may be given to the whole (L'=L'), or (C) feature points (organ points) may be grouped for each part of the face (for example, eyes, nose, mouth), and scores may be given for each group.

In particular, in the case of (B) and (C), it is possible to estimate robust reliability by judging the reliability of the part estimated by the grouped score rather than assigning a score to each point. For example, in estimating the position of an organ point as a feature point from a person's face, when a person is wearing a mask, feature points are arranged in a mouth portion as an initial feature point position, and the extraction of the feature amount and the iteration of the regression calculation are performed. In that case, in general, a low evaluation is obtained in the mask portion. However, in this mask part, there may be a case where there is one feature point with a high score by chance due to wrinkles or the like of the mask. Even in such a case, if it is a grouped score judgment, a low score can be obtained for a group of mask part. If the grouped score is low, it can be considered that all the subject organ point coordinates are low in reliability.

The weight w in the linear transformation for score calculation has, for example, linear SVM and the like, and prepares positive data and negative data so as to learn them in advance. For example, a feature amount (positive data) obtained from a feature point (organ point) fitted to a face of learning data and a feature amount (negative data) randomly fitting a feature point (organ point) to a non-face image are learned by SVM. With this configuration, it is possible to judge whether the estimation of the position of the feature point failed or not by evaluating the score.

Sixth Embodiment

In the present embodiment, the regression calculation unit 14 prioritizes the feature points to be subjected to the regression calculation, and, for example, in the first regression calculation, only the feature amount with the highest priority is used. For the second time, the feature amount with the middle priority level, and for the third time, the feature amount with the lower priority level features are used. In this way, it is divided into stages. For example, when estimating the position of an organ point as a feature point from a person's face, the concept of priority assignment is an order that is not easily affected by face orientation, facial expression, wearing object, individual difference. The priorities are reduced in order of nose, inner corner of the eyes, outer corner of the eyes, end of mouth, etc.

Figure 7:
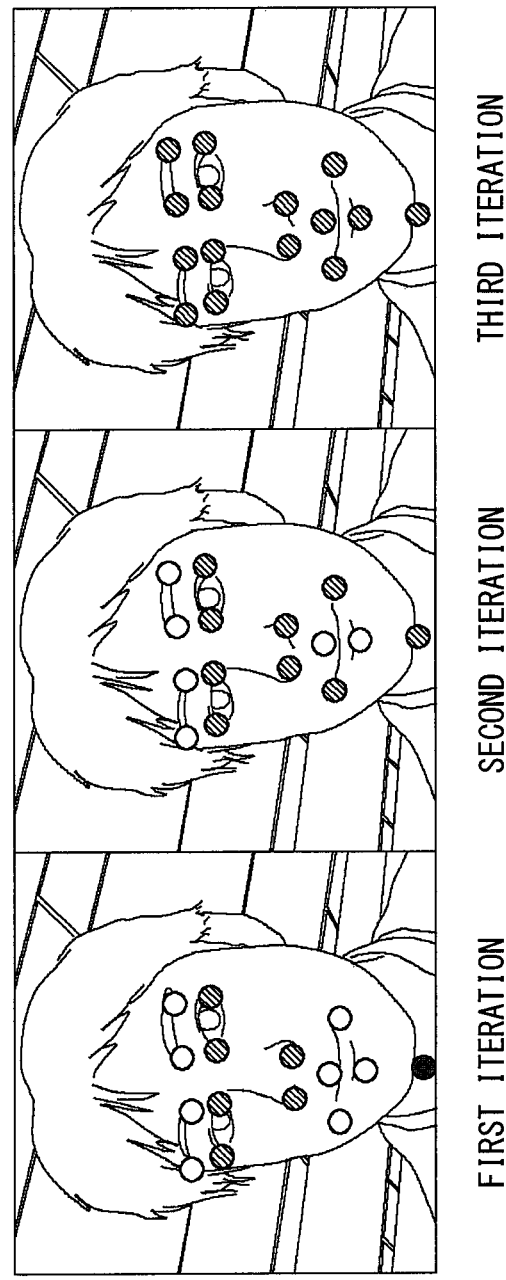
FIG. 7 is a diagram for explaining feature points used for regression calculation in a sixth embodiment.
Figure 8:
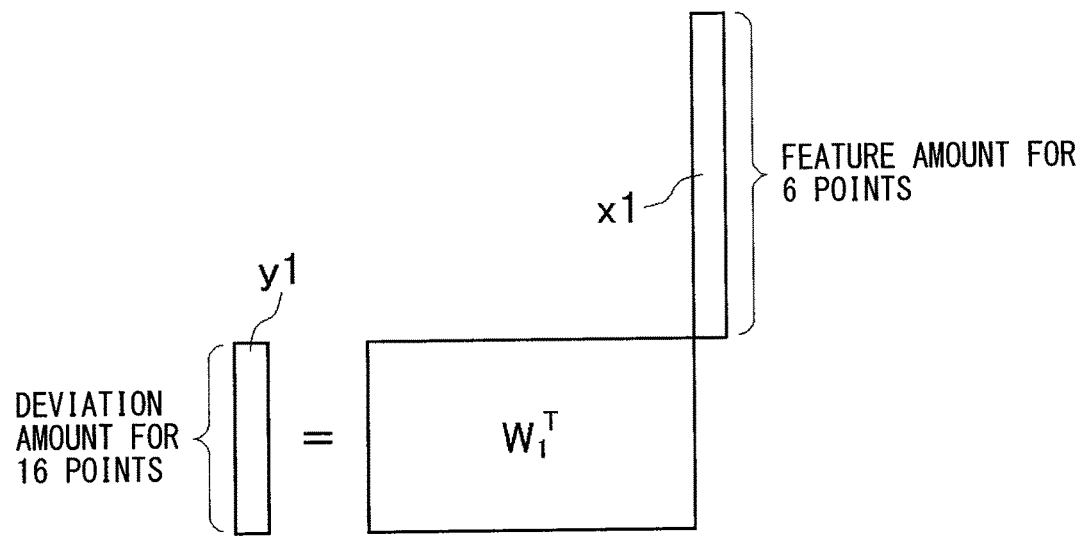
FIG. 8 is a diagram showing a first iterative regression in the sixth embodiment.
Figure 9:
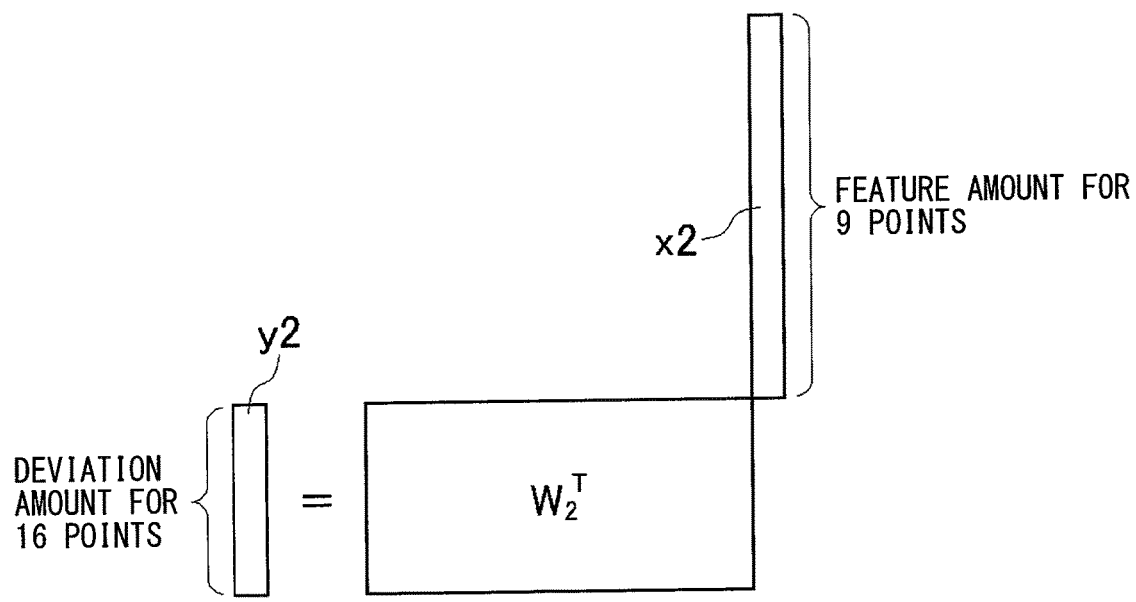
FIG. 9 is a diagram showing a second iterative regression calculation in the sixth embodiment.
Figure 10:
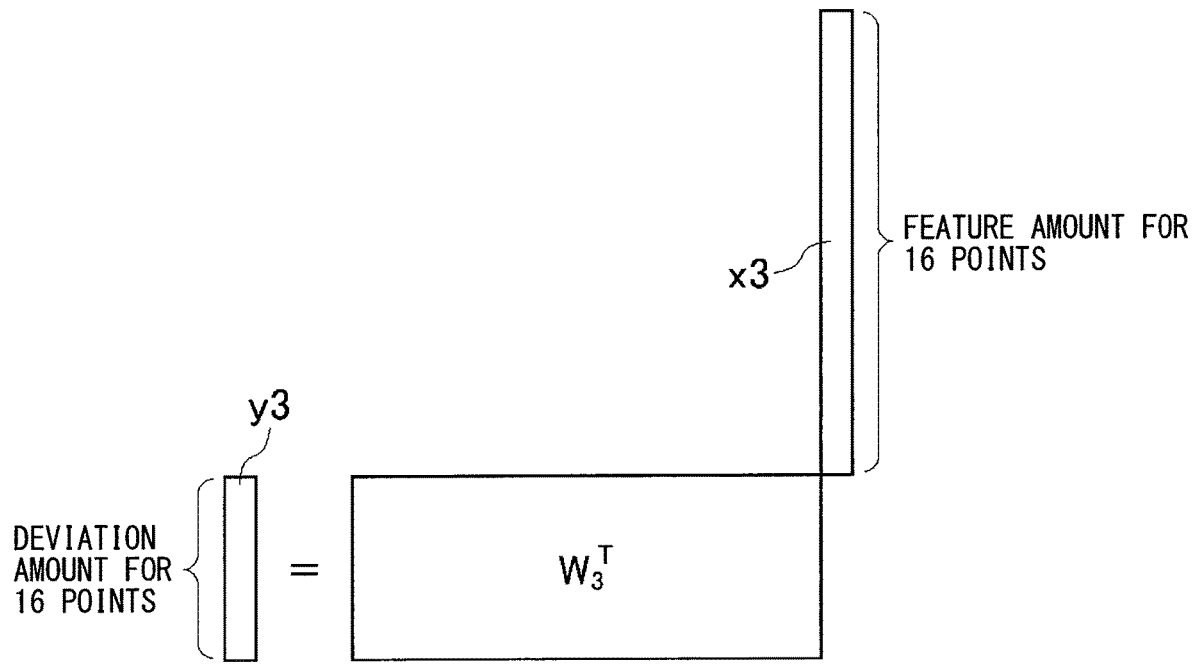
FIG. 10 is a diagram showing a third iterative regression calculation in the sixth embodiment.

FIG. 7 is a diagram for explaining the feature points used in the regression calculation according to the present embodiment. FIG. 8 is a diagram showing the regression calculation of the first iteration. FIG. 9 is a diagram showing the regression calculation of the second iteration. FIG. 10 is a diagram showing the regression calculation of the third iteration. As shown in FIG. 7, in this example, sixteen feature points are arranged, but only six points (feature points hatched in the photograph on the left in FIG. 7) are used in the first iteration. That is, in the first iteration, the regression calculation unit 14 performs regression calculation of a formula $(y_1 = W_1^T x_1)$ shown in FIG. 8 by using only the feature points (6 points) of nose and inner corners of eyes at a high priority. As a result, the deviation amount for all points (16 points) is calculated, and rearrangement can be performed for all points.

In the second iteration, the regression calculation unit 14 performs regression calculation of a formula $(y_2 = W_2^T x_2)$ for nine feature points by further adding three points as shown in FIG. 9. As described above, 9 feature points are input to the input, the deviation amount for 16 points is calculated, and the coordinates of 16 points are estimated. In other words, the number of feature points related to input and output are different, and as the iteration progresses, the number of feature points to be estimated is increased. In the third iteration, as shown in FIG. 10, the regression calculation unit 14 performs a regression calculation of a formula $(y_3 = W_3 T x_3)$ for all 16 feature points.

As described above, according to the present embodiment, in the iteration of the regression calculation, by increasing the number of feature points to be estimated as going to the latter half, the amount and the number of regression calculations can be reduced and the calculation cost can be reduced. In addition, at the initial stage of repetition, throughput can be reduced by using only features of organ points that can be recognized with high robustness.

Seventh Embodiment

Instead of extracting the feature amount from the subject region, the feature amount acquisition unit 13 of the seventh embodiment diverts the feature amount used when the subject detection unit 11 detects the subject region as it is. In this case, the subject detection unit 11 detects a subject region from the subject image by extracting a binary HOG feature amount (Binary HOG) from the subject image and performing identification processing.

Specifically, the subject detection unit 11 generates a pyramid image obtained by reducing the subject image by a plurality of stages of magnifications, divides the image in each stage of the pyramid image into blocks each having a size of 8×8 pixels. After that, the HOG feature amount is extracted from each block, and the feature amount given to each block is converted into a binary vector.

In the discrimination processing, the subject detection unit 11 detects a face area by executing, for example, a linear SVM using a dictionary for each stage image. Then, the subject detection unit 11 cuts out the characteristic amount used for the detection from the image of the stage where the face area is detected, and outputs it to the feature amount acquisition unit 13. When obtaining the feature amount of each feature point, the feature amount acquisition unit 13 uses the feature amount acquired from the subject detection unit 11.

The feature amount acquisition unit 13 of the above embodiment may be configured such that a block (for example, a small area block of 32×32 pixels centered on each feature point as a center) of each feature point arranged (rearranged) is set, and the feature amount is extracted therefrom. In the present modification, since the subject detection unit 11 uses the feature amount extracted for detection of the subject area, this feature amount is not necessarily extracted from the block having the feature point arranged as a reference.

However, in the present embodiment, among the feature quantities of each block extracted by the subject detection unit 11, the feature amount of the block to which the placed feature point belongs is the feature amount of the feature point. As described above, in the present embodiment, the accuracy is lowered from the viewpoint of feature amount extraction, but the position of the feature point can be estimated with sufficient accuracy by performing sufficient iterative processing in SDM. On the other hand, in the present embodiment, since it is unnecessary for the feature amount acquisition unit 13 to calculate the feature amount, the calculation time of feature amount extraction can be shortened and the position estimation of feature points can be speeded up.

Figure 11:
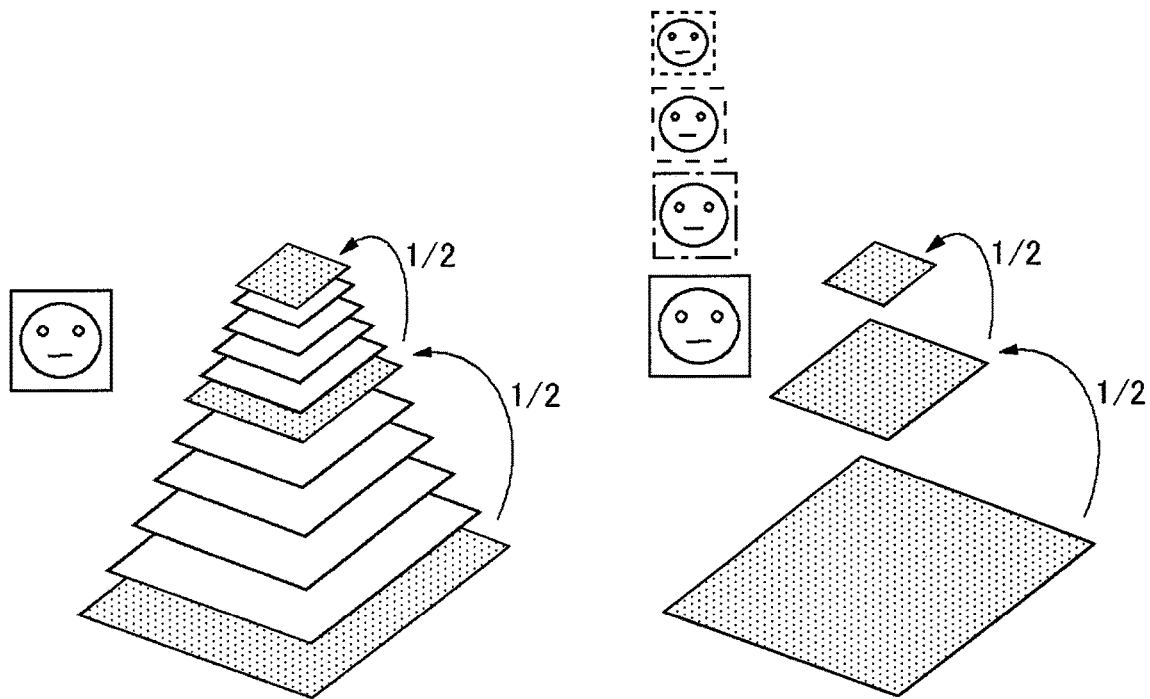
FIG. 11 is a diagram for explaining a process (single dictionary) of a subject detection unit in a seventh embodiment and a process (multiple dictionaries) of the subject detection unit in the seventh embodiment.
Figure 12:
FIG. 12 is a diagram for explaining face region detection in a conventional SDM.
Figure 13:
FIG. 13 is a diagram for explaining a positioning of average organ points in the conventional SDM.
Figure 14:
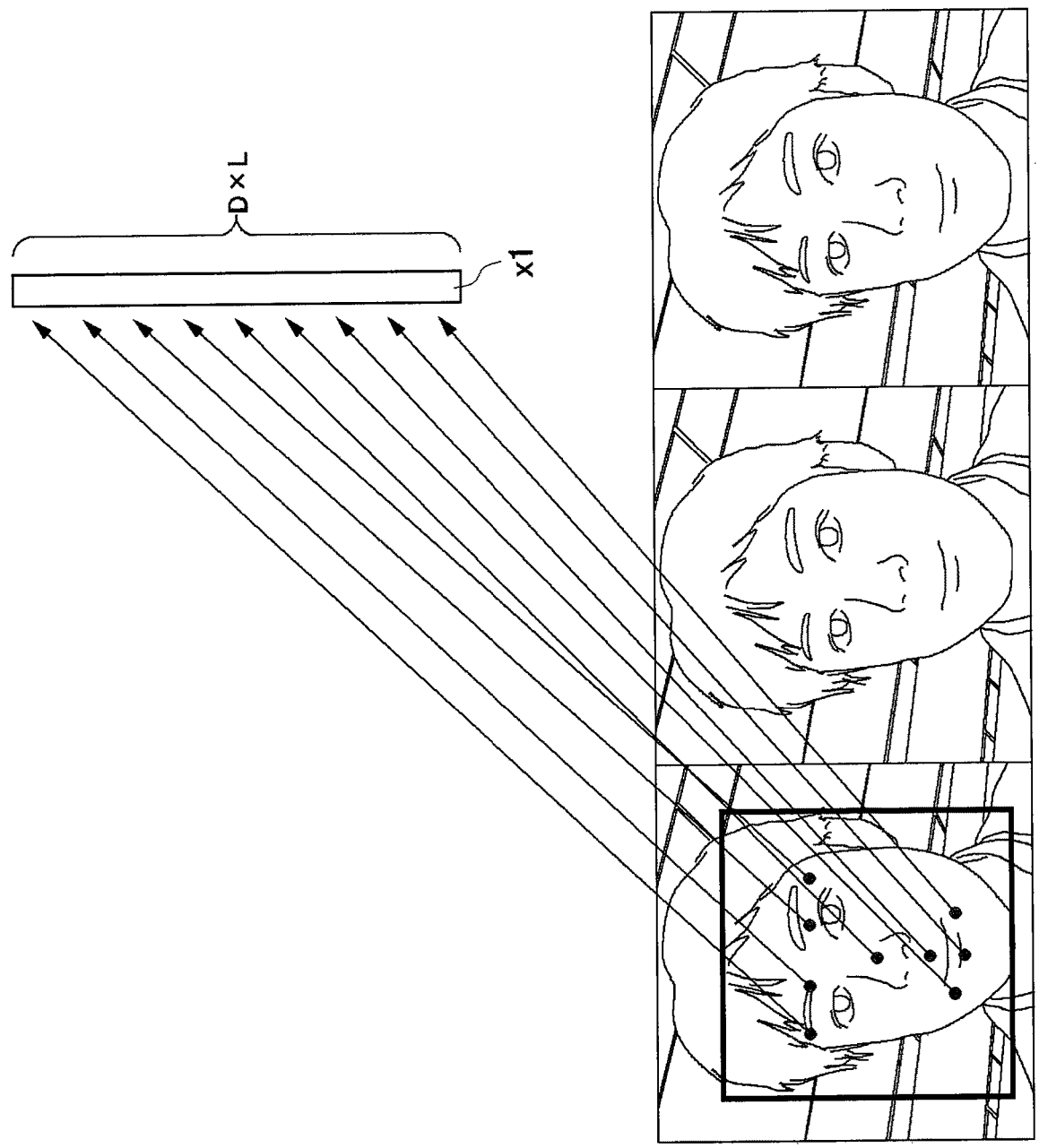
FIG. 14 is a diagram illustrating a feature amount extraction in the conventional SDM.
Figure 15:
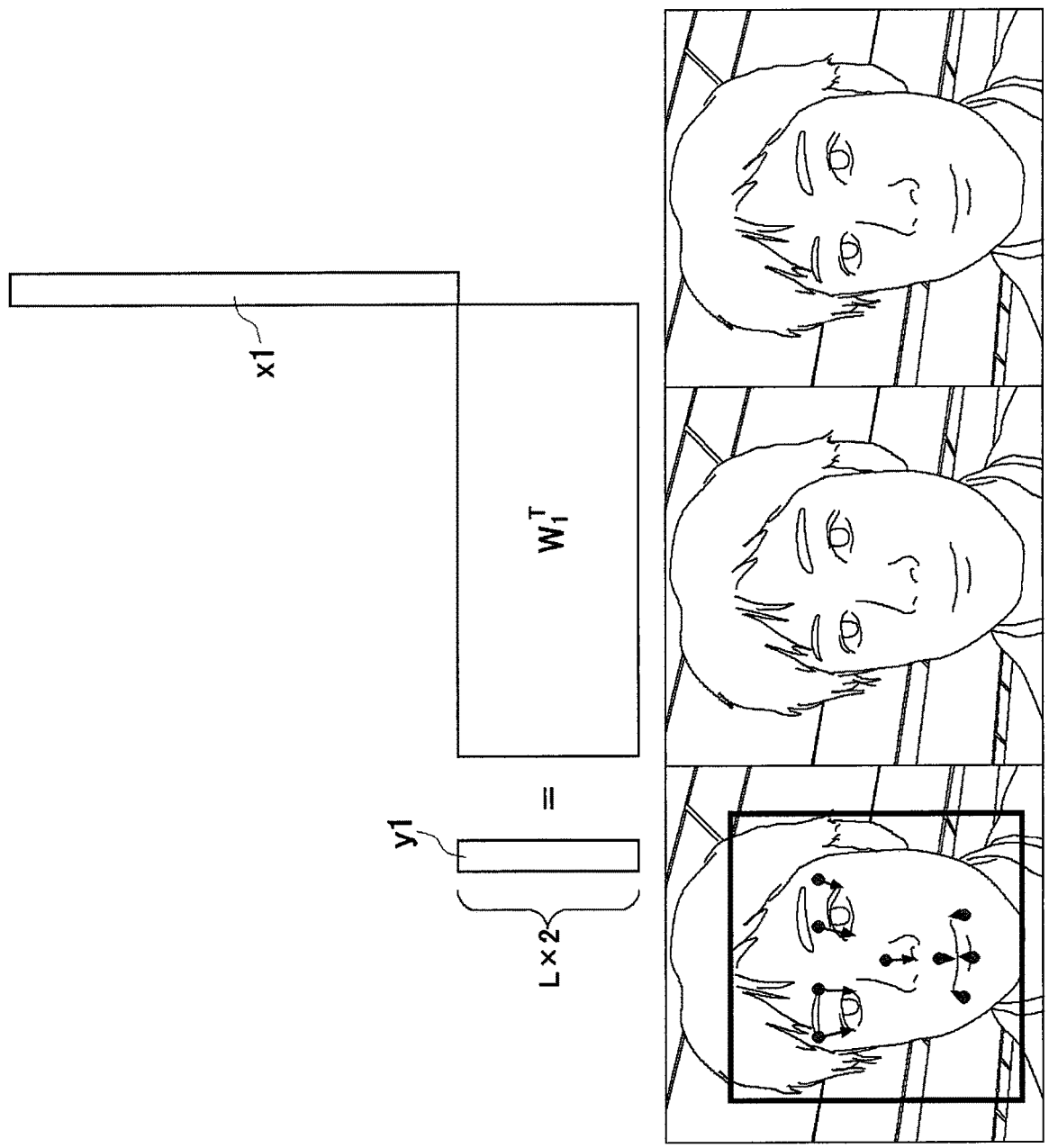
FIG. 15 is a diagram for explaining calculation of a difference vector by regression in the conventional SDM.
Figure 16:
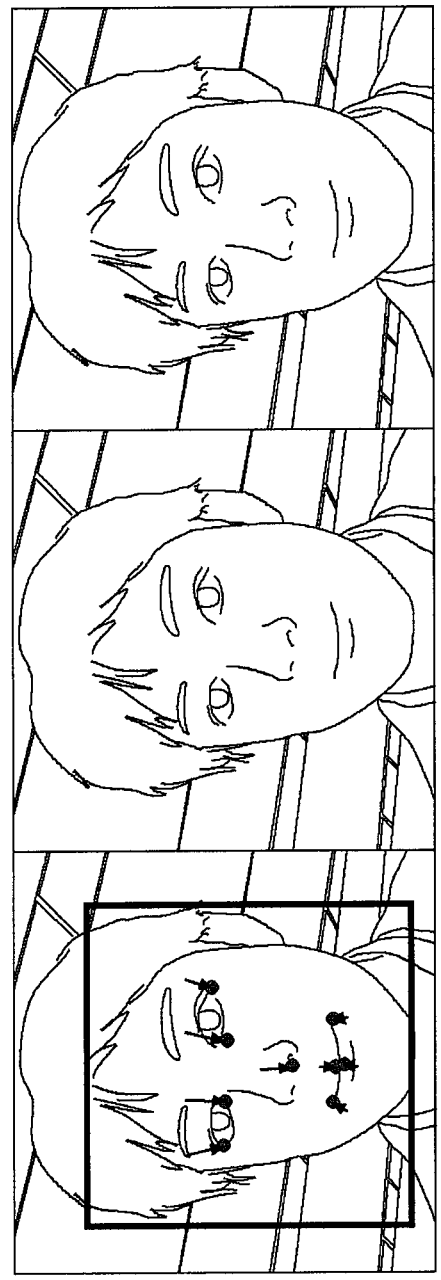
FIG. 16 is a view for explaining rearrangement of organ points in the conventional SDM.
Figure 17:
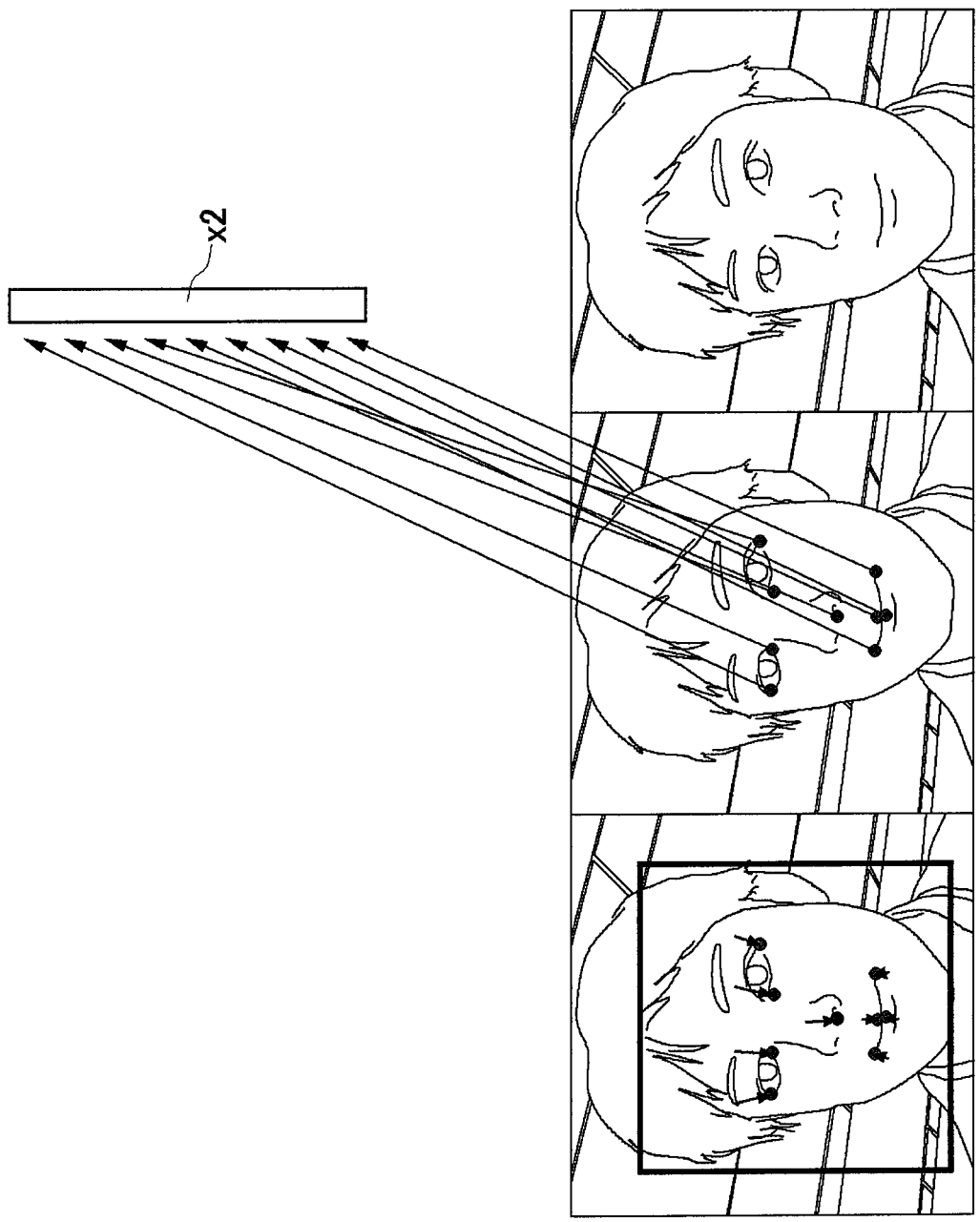
FIG. 17 is a diagram for explaining feature amount extraction in the conventional SDM.
Figure 18:
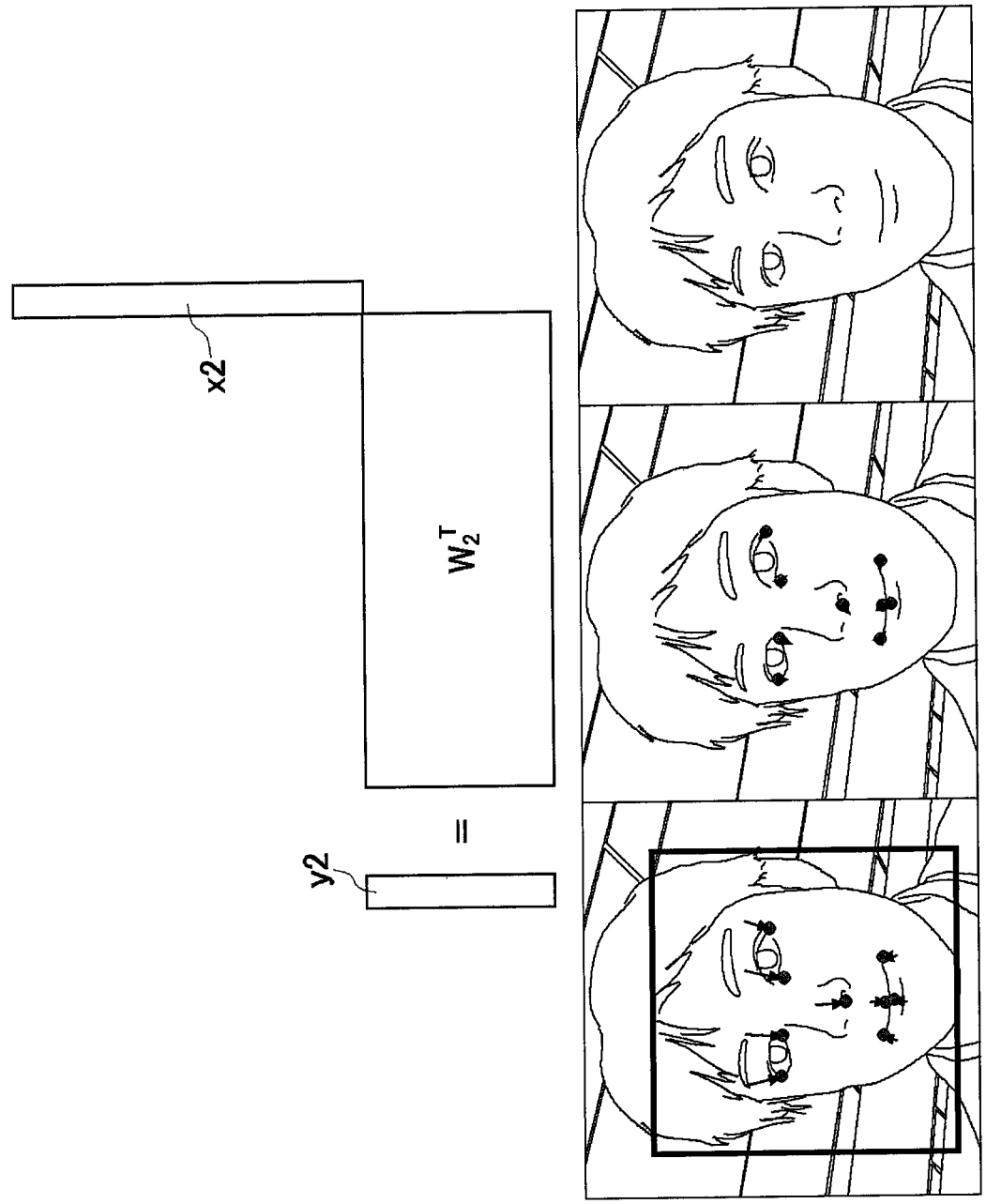
FIG. 18 is a diagram for explaining calculation of a difference vector by regression in the conventional SDM.
Figure 19:
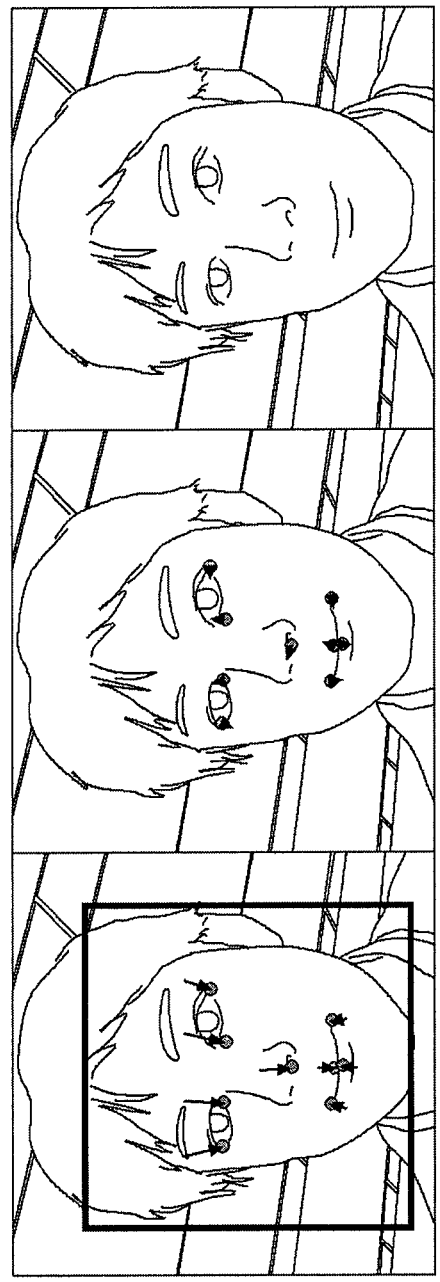
FIG. 19 is a view for explaining repositioning of organ points in the conventional SDM.
Figure 20:
FIG. 20 is a diagram showing a plurality of organ points obtained by the conventional SDM.

FIG. 11 is a diagram for explaining the process of the subject detection unit 11. When the subject detection unit 11 detects the subject region from the pyramid image, as shown in the left part of FIG. 11, the identification processing may be performed for each stage image of the pyramid image with one dictionary, as shown in the right part of FIG. 11, a pyramid dictionary consisting of a plurality of dictionaries of different sizes may be prepared, and a coarse pyramid image in which the pyramid image in the left part of FIG. 11 is thinned out may be generated and the identification process may be performed.

In the feature point position estimation processing of repeating the feature amount acquisition and the regression calculation, since the regression matrix used for the regression calculation is matrix-partitioned, the memory consumption amount and the calculation amount can be reduced, and it is useful as a feature point estimating device or the like for estimating the position of the feature point in the image.

What is claimed is:

1. A feature point position estimation device, comprising a processor and memory storing computer-executable instructions that, when executed by the processor, cause the processor to:
   detect a subject region from a subject image;
   determine an initial feature point position of a feature point prepared in advance for the detected subject region;
   acquire an initial feature amount based on the initial feature point position of the feature point and generate an initial feature vector by integrating the initial feature amount;
   calculate an initial difference vector by transforming the initial feature vector with a matrix-resolved regression matrix, the initial difference vector representing an initial deviation amount between the initial feature point position of the feature point and an actual position of the feature point, the matrix-resolved regression matrix being decomposed into a basis matrix and a coefficient matrix, the basis matrix and the coefficient matrix each being a real number matrix;
   determine a corrected feature point position of the feature point based on the initial difference vector;
   iteratively repeat a plurality of times a process including:
      acquiring a subsequent feature amount based on the corrected feature point position of the feature point and generating a subsequent feature vector by integrating the subsequent feature amount;
      calculating a subsequent difference vector by transforming the subsequent feature vector with the matrix-resolved regression matrix, the subsequent difference vector representing a subsequent deviation amount between the corrected feature point position of the feature point and the actual position of the feature point; and
      updating the corrected feature point position of the feature point based on the subsequent difference vector; and
   output the corrected feature point position as a position of the feature point after iteratively repeating the process the plurality of times.

2. The feature point position estimation device according to claim 1, wherein
   the regression matrix is decomposed into the basis matrix and the coefficient matrix by singular value decomposition.

3. The feature point position estimation device according to claim 1, wherein
   the feature point position estimation device determines the position of the feature point with respect to each of a plurality of subject images, including the subject image, of a plurality of consecutive frames, and
   the initial feature point position of the feature point for a current frame of the plurality of consecutive frames is set to be the position of the feature point after iteratively repeating the process the plurality of times for a previous frame.

4. The feature point position estimation device according to claim 1, wherein the computer-executable instructions, when executed by the processor, further cause the processor to:

obtain a score of the feature point by linearly transforming the subsequent feature amount.

5. The feature point position estimation device according to claim 4, wherein the computer-executable instructions, when executed by the processor, further cause the processor to:
group a plurality of feature points for which corrected feature point positions have been determined by the processor and obtain a score for each group.

6. The feature point position estimation device according to claim 1, wherein the computer-executable instructions, when executed by the processor, further cause the processor to:
calculate a position for only some feature points with a high priority among a plurality of feature points.

7. The feature point position estimation device according to claim 1, wherein the computer-executable instructions, when executed by the processor, further cause the processor to:
detect the subject region from the subject image based on extracting a feature amount from each of a plurality of blocks of the subject image and perform identification processing.

8. The feature point position estimation device according to claim 7, wherein the computer-executable instructions, when executed by the processor, further cause the processor to:
acquire feature amount of the block to which the feature point belongs as a feature amount of the feature point.

9. A non-transitory computer-readable medium storing a feature point position estimation program that, when executed by a computer, causes the computer to:
to detect a subject region from a subject image;
determine at an initial feature point position of a feature point prepared in advance for the detected subject region;
acquire an initial feature amount based on the initial feature point position of the feature point and generate an initial feature vector by integrating the initial feature amount;
calculate an initial difference vector by transforming the initial feature vector with a matrix-resolved regression matrix, the initial difference vector representing an initial deviation amount between the initial feature point position of the feature point and an actual position of the feature point, the matrix-resolved regression matrix being decomposed into a basis matrix and a coefficient matrix, the basis matrix and the coefficient matrix each being a real number matrix;
determine a corrected feature point position of the feature point based on the initial difference vector;
iteratively repeat a plurality of times a process including:
acquiring a subsequent feature amount based on the corrected feature point position of the feature point and generating a subsequent feature vector by integrating the subsequent feature amount;
calculating a subsequent difference vector by transforming the subsequent feature vector with the matrix-resolved regression matrix, the subsequent difference vector representing a subsequent deviation amount between the corrected feature point position of the feature point and the actual position of the feature point; and
updating the corrected feature point position of the feature point based on the subsequent difference vector; and
output the corrected feature point position as a position of the feature point after iteratively repeating the process the plurality of times.

10. A feature point position estimation method, comprising:
detecting a subject region from a subject image;
determining an initial feature point position of a feature point prepared in advance for the detected subject region;
acquiring an initial feature amount based on the initial feature point position of the feature point and generate an initial feature vector by integrating the initial feature amount;
calculating an initial difference vector by transforming the initial feature vector with a matrix-resolved regression matrix, the initial difference vector representing an initial deviation amount between the initial feature point position of the feature point and an actual position of the feature point, the matrix-resolved regression matrix being decomposed into a basis matrix and a coefficient matrix, the basis matrix and the coefficient matrix each being a real number matrix;
determining a corrected feature point position of the feature point based on the initial difference vector;
iteratively repeating a plurality of times a process including:
acquiring a subsequent feature amount based on the corrected feature point position of the feature point and generating a subsequent feature vector by integrating the subsequent feature amount;
calculating a subsequent difference vector by transforming the subsequent feature vector with the matrix-resolved regression matrix, the subsequent difference vector representing a subsequent deviation amount between the corrected feature point position of the feature point and the actual position of the feature point; and
updating the corrected feature point position of the feature point based on the subsequent difference vector; and
outputting the corrected feature point position as a position of the feature point after iteratively repeating the process the plurality of times.

* * * * *